US010368344B2

(12) United States Patent
Zhou et al.

(10) Patent No.: US 10,368,344 B2
(45) Date of Patent: Jul. 30, 2019

(54) USER EQUIPMENT, NETWORK SIDE DEVICE AND METHOD FOR CONTROLLING USER EQUIPMENT

(71) Applicant: Spreadtrum Communications (Shanghai) Co., Ltd., Shanghai (CN)

(72) Inventors: Huayu Zhou, Shanghai (CN); Weijie Xu, Shanghai (CN); Zhengang Pan, Shanghai (CN); Yanan Jia, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 163 days.

(21) Appl. No.: 15/467,048

(22) Filed: Mar. 23, 2017

(65) Prior Publication Data

US 2017/0289969 A1   Oct. 5, 2017

(30) Foreign Application Priority Data

Apr. 1, 2016   (CN) .......................... 2016 1 0204239

(51) Int. Cl.
*H04W 72/04*   (2009.01)
(52) U.S. Cl.
CPC ..... *H04W 72/042* (2013.01); *H04W 72/0446* (2013.01)
(58) Field of Classification Search
CPC .................................................. H04W 72/042
USPC ......................................................... 370/329
See application file for complete search history.

(56) References Cited

U.S. PATENT DOCUMENTS

| 2011/0194551 A1* | 8/2011 | Lee ...................... H04B 7/0626 370/342 |
| 2016/0057744 A1 | 2/2016 | Pan et al. |
| 2017/0135105 A1 | 5/2017 | Li et al. |

FOREIGN PATENT DOCUMENTS

| CN | 102137504 A | 7/2011 |
| CN | 103491516 A | 1/2014 |
| CN | 104104465 A | 10/2014 |
| CN | 105099634 A | 11/2015 |

OTHER PUBLICATIONS

CN Office Action dated May 2, 2018 in Chinese Patent Application No. 201610204239.X.

* cited by examiner

*Primary Examiner* — Shripal K Khajuria
(74) *Attorney, Agent, or Firm* — Vierra Magen Marcus LLP

(57) ABSTRACT

A user equipment, a network side device and a method for controlling the user equipment. The method includes: generating control information of the user equipment, wherein the control information is adapted to indicate configuration of downlink data reception of the user equipment or configuration of uplink data transmission of the user equipment; adding the generated control information to downlink control signaling; and transmitting the downlink control signaling to the user equipment to instruct the user equipment to configure corresponding parameters according to the control information for data transmission with the network side. The present disclosure can improve configuration flexibility of the user equipment.

29 Claims, 10 Drawing Sheets

(a)

(b)

USER EQUIPMENT, NETWORK SIDE DEVICE AND METHOD FOR CONTROLLING USER EQUIPMENT

CROSS-REFERENCE TO RELATED APPLICATIONS

This application claims the benefit of priority to Chinese Patent Application No. 201610204239.X, titled "USER EQUIPMENT, NETWORK SIDE DEVICE AND METHOD FOR CONTROLLING USER EQUIPMENT", filed on Apr. 1, 2016, the entire disclosure of which are incorporated herein by reference.

TECHNICAL FIELD

The present disclosure relates to communication technology field, and more particularly, to a user equipment, a network side device and a method for controlling the user equipment.

BACKGROUND

The Fifth Generation (5G) mobile communication technology is a main development trend of a new generation mobile communication technology, and is an important part of a new generation of information infrastructure in the future. Compared with 4G, 5G will not only further improve the user's network experience, but also meet the future application requirements of Internet of Everything (IoE). From the user's experience, 5G has a higher speed and a wider bandwidth. 5G is expected to be about 10 times faster than 4G, and it will just take a few seconds to download a high-definition movie, and is capable of meeting demand of consumers for virtual reality, super high-definition video or other higher network experience requirements. From industry application perspective, 5G has a higher reliability, and a lower latency, which can meet the specific needs of industry application such as intelligent manufacturing and automatic driving etc., broaden development space of convergence industry and support innovation and development of economic society.

In a conventional technology, taking a Long Term Evolution (LTE) communication system as an example, physical layer control signaling (also referred to as layer 1 control signaling) is embodied by Downlink Control Information (DCI), wherein the DCI is transmitted through a Physical Downlink Control Channel (PDCCH). By blindly detecting the PDCCH, a user equipment obtains physical layer control signaling sent from a base station to the user equipment, such as scheduling information etc. Media Access Layer (MAC) control signaling (also referred to as layer 2 control signaling) is embodied by a MAC Control Entity (CE), wherein the MAC CE is carried in a header of a MAC Protocol Data Unit (PDU). Control signaling in a radio resource control layer (also referred to as layer 3 control signaling) is embodied by Radio Resource Control signaling (RRC), wherein the RRC is mapped onto the Physical Downlink Share Channel (PDSCH), including public control messages such as Paging, System Information (SI) and Random Access Response (RAR) etc., as well as dedicated control messages for connection management and mobility management etc. of the user equipment such as an RRC reconfiguration message etc.

However, in the conventional technology, when data transmission is performed between the user equipment and a communication network, there is a problem of poor configuration flexibility, which can not meet requirements of 5G.

SUMMARY

Problems solved by the present disclosure is how to improve channel estimation efficiency of a Multiple Input Multiple Output (MIMO) system.

In order to solve the aforementioned problems, a method for controlling a user equipment is provided according to an embodiment of the present disclosure. The method includes: generating control information of the user equipment, wherein the control information is adapted to indicate configuration of downlink data reception of the user equipment or configuration of uplink data transmission of the user equipment; adding the generated control information to downlink control signaling; and transmitting the downlink control signaling to the user equipment to instruct the user equipment to configure corresponding parameters according to the control information for data transmission with a network side.

Optionally, the control information includes at least one of subcarrier configuration information and signal waveform configuration information.

Optionally, the subcarrier configuration information includes configuration information of a plurality of groups of subcarrier parameters, and configuration information of each group of the plurality of groups of subcarrier parameters includes at least one of a subcarrier spacing, a cyclic prefix length, number of subcarriers in a resource unit, number of symbols in the resource unit and mode information of a group of reference signals or a plurality of groups of reference signals.

Optionally, the signal waveform configuration information includes any of multi-carrier waveforms and single carrier waveforms, and the multi-carrier waveforms and the single-carrier waveforms are selected from a set of preset signal waveforms.

Optionally, the downlink control signaling is physical layer control signaling.

Optionally, generating the control information of the user equipment includes: selecting a configuration element from a preset configuration set by the physical layer control signaling, and using the selected configuration element as the control information.

Optionally, generating the control information of the user equipment includes: selecting J configuration elements from M configuration elements in a preset configuration set by Radio Resource Control (RRC) signaling; wherein M and J are positive integers and J is less than or equal to M; and selecting a configuration element from the selected J configuration elements by the physical layer control signaling as the control information.

Optionally, adding the generated control information to the downlink control signaling includes: adding an index corresponding to the selected configuration element to the physical layer control signaling.

Optionally, the configuration element includes at least one of subcarrier configuration information and signal waveform configuration information.

Optionally, instructing the user equipment to configure the corresponding parameters according to the control information for the data transmission with the network side includes: instructing the user equipment to configure the corresponding parameters in accordance with the control information during a preset time period or before receiving next control information, and instructing the user equipment to use preset parameters to perform data transmission with the network side when the preset time period is due.

Optionally, the preset parameters are transmitted to the user equipment by a system information.

Optionally, the preset parameters are transmitted to the user equipment by RRC signaling.

Optionally, the physical layer control signaling includes common control signaling and dedicated control signaling; wherein the common control signaling includes control information of a group of or all user equipments accessing a corresponding cell; and wherein the dedicated control signaling includes control information of one user equipment accessing a corresponding cell.

Optionally, adding the generated control information to the downlink control signaling includes adding the generated control information to the common control signaling or adding the generated control information to the dedicated control signaling according to a network condition.

Optionally, the common control signaling and the dedicated control signaling are transmitted periodically, and a transmission period of the common control signaling is longer than a transmission period of the dedicated control signaling.

Optionally, the common control signaling further includes information on a receiving object of all of the dedicated control signaling before next common control signaling arriving, to instruct the receiving object to detect the dedicated control signaling; and wherein the reception object is one of the user equipments accessing the corresponding cell.

Optionally, the common control signaling is transmitted using a Long Term Evolution (LTE) carrier, and the dedicated control signaling is transmitted using a 5G carrier.

A method for controlling a user equipment is also provided according to an embodiment of the present disclosure. The method includes: decoding the downlink control signaling to obtain control information when downlink control signaling transmitted by a network side is received, wherein the control information is adapted to indicate configuration of downlink data reception of the user equipment or configuration of uplink data transmission of the user equipment; and configuring corresponding parameters in accordance with the control information, to perform data transmission with the network side.

Optionally, the control information includes at least one of subcarrier configuration information and signal waveform configuration information.

Optionally, the subcarrier configuration information includes configuration information of a plurality of groups of subcarrier parameters, and configuration information of each group of the plurality of groups of subcarrier parameters includes at least one of a subcarrier spacing, a cyclic prefix length, number of subcarriers in a resource unit, number of symbols in the resource unit and mode information of a group of reference signals or a plurality of groups of reference signals.

Optionally, the signal waveform configuration information includes any of multi-carrier waveforms and single carrier waveforms, and the multi-carrier waveforms and the single-carrier waveforms are selected from a set of preset signal waveforms.

Optionally, the downlink control signaling is physical layer control signaling.

Optionally, decoding the downlink control signaling to obtain the control information includes: decoding index information from the downlink control signaling; and searching a preset index table to obtain a corresponding configuration element as the control information based on the decoded index information, wherein the index table includes a one-to-one correspondence relationship between indexes and configuration elements.

Optionally, performing the data transmission with the network side includes: performing the data transmission with the network side using the corresponding parameters in a preset time period or before receiving next control information.

Optionally, the method further includes performing the data transmission with the network side using preset parameters when the preset time period is due.

Optionally, the physical layer control signaling includes common control signaling and dedicated control signaling; wherein the common control signaling includes control information of a group of or all user equipments accessing a corresponding cell; and wherein the dedicated control signaling includes control information of a user equipment accessing a corresponding cell.

Optionally, the common control signaling and the dedicated control signaling are transmitted periodically, and a transmission period of the common control signaling is longer than a transmission period of the dedicated control signaling.

Optionally, the common control signaling further includes identification information of all of the dedicated control signaling and identification information of a corresponding receiving object before next common control signaling arriving; and wherein decoding the downlink control signaling to obtain the control information includes: decoding the identification information of all of the dedicated control signaling and the identification information of the corresponding receiving object from the received common control signaling before the next common control signaling arriving; and when it is determined that identification information of the user equipment itself is coincident with the decoded identification information of the receiving object, receiving and decoding corresponding dedicated control signaling to obtain the control information.

Optionally, the control information is applied to configure corresponding parameters of a data transmission channel of the user equipment.

Optionally, the method further includes configuring a common physical channel using preset configuration parameters.

Optionally, the preset configuration parameters includes at least one of subcarrier configuration information and signal waveform configuration information.

A network side device is also provided according to an embodiment of the present disclosure. The network side device further includes: an information generating circuitry, configured to generate control information of a user equipment, wherein the control information is adapted to indicate configuration of downlink data reception of the user equipment or configuration of uplink data transmission of the user equipment; a signaling generating circuitry, configured to add the generated uplink and downlink control information to downlink control signaling; and a transmitting and receiving circuitry, configured to transmit the downlink control signaling to the user equipment to instruct the user equipment to configure corresponding parameters according to the control information for data transmission with a network side.

Optionally, the control information includes at least one of subcarrier configuration information and signal waveform configuration information.

Optionally, the subcarrier configuration information includes configuration information of a plurality of groups of subcarrier parameters, and configuration information of each group of the plurality of groups of subcarrier parameters includes at least one of a subcarrier spacing, a cyclic prefix length, number of subcarriers in a resource unit, number of symbols in the resource unit and mode information of a group of reference signals or a plurality of groups of reference signals.

Optionally, the signal waveform configuration information includes any of multi-carrier waveforms and single carrier waveforms, and the multi-carrier waveforms and the single-carrier waveforms are selected from a set of preset signal waveforms.

Optionally, the downlink control signaling is physical layer control signaling.

Optionally, the information generating circuitry is configured to select a configuration element from a preset configuration set by the physical layer control signaling, and use the selected configuration element as the control information.

Optionally, the information generating circuitry is configured to: select N configuration elements from M configuration elements in a preset configuration set by RRC signaling, wherein M and N are positive integers and N is less than or equal to M; select I configuration elements from the selected N configuration elements by Media Access Control (MAC) layer control signaling, wherein I is a positive integer and I is less than or equal to N; and select a configuration element from the selected I configuration elements by the physical layer control signaling as the control information.

Optionally, the signaling generating circuitry is configured to add an index corresponding to the selected configuration element to the physical layer control signaling.

Optionally, the configuration element includes at least one of subcarrier configuration information and signal waveform configuration information.

Optionally, the physical layer control signaling includes common control signaling and dedicated control signaling; wherein the common control signaling includes control information of a group of or all user equipments accessing a corresponding cell; and wherein the dedicated control signaling includes dedicated control information of one user equipment accessing a corresponding cell.

Optionally, the signaling generating circuitry is configured to add the generated control information to the common control signaling or add the generated control information to the dedicated control signaling according to a network condition.

Optionally, the common control signaling and the dedicated control signaling are transmitted periodically.

Optionally, a transmission period of the common control signaling is longer than a transmission period of the dedicated control signaling.

Optionally, the common control signaling further includes information on a receiving object of all of the dedicated control signaling before next common control signaling arriving, to instruct the receiving object to detect the dedicated control signaling; and wherein the receiving object is one of user equipments accessing the corresponding cell.

Optionally, the common control signaling is transmitted using an LTE carrier, and the dedicated control signaling is transmitted using a 5G carrier.

A user equipment is also provided according to an embodiment of the present disclosure. The user equipment includes: an decoding circuitry, configured to decode the downlink control signaling to obtain control information, when receiving downlink control signaling transmitted by a network side, wherein the control information is adapted to indicate configuration of downlink data reception of the user equipment or configuration of uplink data transmission of the user equipment; and a configuring circuitry, configured to configure corresponding parameters in accordance with the control information, to perform data transmission with the network side.

Optionally, the control information includes at least one of subcarrier configuration information and signal waveform configuration information.

Optionally, the subcarrier configuration information includes configuration information of a plurality of groups of subcarrier parameters, and configuration information of each group of the plurality of groups of subcarrier parameters includes at least one of a subcarrier spacing, a cyclic prefix length, number of subcarriers in a resource unit, number of symbols in the resource unit and mode information of a group of reference signals or a plurality of groups of reference signals.

Optionally, the signal waveform configuration information includes any of multi-carrier waveforms and single carrier waveforms, and the multi-carrier waveforms and the single-carrier waveforms are selected from a set of preset signal waveforms.

Optionally, the downlink control signaling is physical layer control signaling.

Optionally, the decoding circuitry is configured to: decode index information from the downlink control signaling; and search a preset index table to obtain corresponding configuration element as the control information based on the decoded index information, wherein the index table includes a one-to-one correspondence relationship between indexes and configuration elements.

Optionally, the user equipment further includes a data transmission circuitry, configured to perform the data transmission with the network side using the corresponding parameters in a preset time period or before receiving next control information.

Optionally, the data transmission circuitry is further configured to perform the data transmission with the network side using preset parameters when the preset time period is due.

Optionally, the physical layer control signaling includes common control signaling and dedicated control signaling; wherein the common control signaling includes control information of a group of or all user equipments accessing a corresponding cell; and wherein the dedicated control signaling includes control information of one user equipment accessing a corresponding cell.

Optionally, the common control signaling and the dedicated control signaling are transmitted periodically, and a transmission period of the common control signaling is longer than a transmission period of the dedicated control signaling.

Optionally, the common control signaling further includes identification information of all of the dedicated control signaling and identification information of a corresponding receiving object before next common control signaling arriving; and wherein the decoding circuitry is configured to: decode the identification information of all of the dedicated control signaling and the identification information of the corresponding receiving object from the received common control signaling before the next common control signaling arriving; and when it is determined that identification information of the user equipment itself is coincident with the decoded identification information of the receiving object, receive and decode corresponding dedicated control signaling to obtain the control information.

Optionally, the control information is applied to configure corresponding parameters of a data transmission channel.

Optionally, the configuring circuitry is further configured to configure a common physical channel with preset configuration parameters.

Optionally, the preset configuration parameters includes at least one of subcarrier configuration information and signal waveform configuration information.

Compared with the conventional technology, the present disclosure has the following advantages:

The network side transmits the control information to the user equipment through the downlink control signaling, so that the user equipment can acquire the control information in time to configure the corresponding parameters, and perform the data transmission with the network side using the corresponding configuration parameters instead of using fixed configuration parameters. Thus, configuration flexibility of the user equipment can be improved.

Further, the network side device transmits the control information to the user equipment by the physical layer control signaling instead of by the RRC signaling, so that the user equipment can acquire the control information without using other physical channels or without being mapped to an upper layer such as the MAC layer or the RRC layer. Therefore, configuration delay of the configuration information of the user equipment can be reduced and configuration efficiency of the user equipment can be improved.

Further, number of bits of the physical layer control signaling can be reduced by selecting a configuration element from a preset configuration set, adding the index corresponding to the selected configuration element to the physical layer control signaling and sending the index to the user equipment. Therefore, resources occupied by signaling can be reduced.

Further, the configuration element is selected from the preset configuration set by combining the physical layer control signaling with the RRC signaling and/or the MAC layer control signaling, and the index of the selected configuration element is added to the physical layer control signaling and sent to the user equipment. Therefore, resources occupied by signaling can be further saved since a transmission period of the MAC layer control signaling and a transmission period of the RRC signaling are longer than a transmission period of the physical layer control signaling.

Further, the control information includes at least one of the subcarrier configuration information and the signal waveform configuration information, and the network side device can instruct the user equipment to configure the corresponding parameters as required, therefore both configuration flexibility of the user equipment and the user experience can be improved.

Further, the physical layer control signaling is divided into the common control signaling and the dedicated control signaling, and the common control signaling and the dedicated control signaling are transmitted separately. Thus, the control information of the user equipment can be added to the common control signaling or the dedicated control signaling and be transmitted to the user equipment according to actual requirements, such as different requirements in configuration delay, so as to further improve flexibility of resource configuration.

Further, both the common control signaling and the dedicated control signaling are set to be transmitted periodically, and the transmission period of the common control signaling can be set longer than the transmission period of the dedicated control signaling as required, so that the common control signaling can indicate the information on the receiving object of all of the dedicated control signaling before the next common control signaling arriving. Accordingly, the user equipment being partially in an idle state or in a sleep state may detect only the common control signaling or a portion of the dedicated control signaling, which can save electricity consumption of the user equipment.

Further, since the common control signaling is transmitted using the LTE carrier, and the dedicated control signaling is transmitted using the 5G carrier, transmission reliability of the common control signaling and transmission delay of the dedicated control signaling can be improved, and further flexibility of resource configuration is enhanced.

DETAILED DESCRIPTION

In a conventional technology, taking a Long Term Evolution (LTE) communication system as an example, physical layer control signaling (also referred to as layer 1 control signaling) is manifested as Downlink Control Information (DCI), wherein the DCI is transmitted through a Physical Downlink Control Channel (PDCCH). By blindly detecting the PDCCH, a user equipment obtains physical layer control signaling sent from a base station to the user equipment, such as scheduling information etc. Media Access Layer (MAC) control signaling (also referred to as layer 2 control signaling) is manifested as a MAC Control Entity (CE), wherein the MAC CE is carried in a header of a MAC Protocol Data Unit (PDU). Control signaling in a radio resource control layer (also referred to as layer 3 control signaling) is manifested as Radio Resource Control signaling (RRC), wherein the RRC is mapped onto the Physical Downlink Share Channel (PDSCH), including public control messages such as Paging, System Information (SI) and Random Access Response (RAR) etc., as well as dedicated control messages for connection management and mobility management etc. of the user equipment such as an RRC reconfiguration message etc.

In the future 5G system, in order to achieve greater flexibility and self-adaptability, resources allocated to the user by the base station no longer adopt fixed subcarrier configuration and signal waveform configuration, but adopt variable subcarrier configuration and signal waveform configuration. In order to solve the aforementioned problems in the conventional technology, a network side according to some embodiments of the present disclosure transmits control information to the user equipment through downlink control signaling, wherein the control information is adapted to indicate configuration of downlink data reception of the user equipment or configuration of uplink data transmission of the user equipment, so that the user equipment can acquire the control information timely to configure corresponding parameters, and perform data transmission with the network side using the corresponding configuration parameters instead of using fixed configuration parameters. Thus, configuration flexibility of the user equipment can be improved.

The foregoing and other objects, features and advantages of the present disclosure will become more apparent from the following detailed description of the preferred embodiments of the present disclosure when taken in conjunction with the accompanying drawings.

Figure 1:
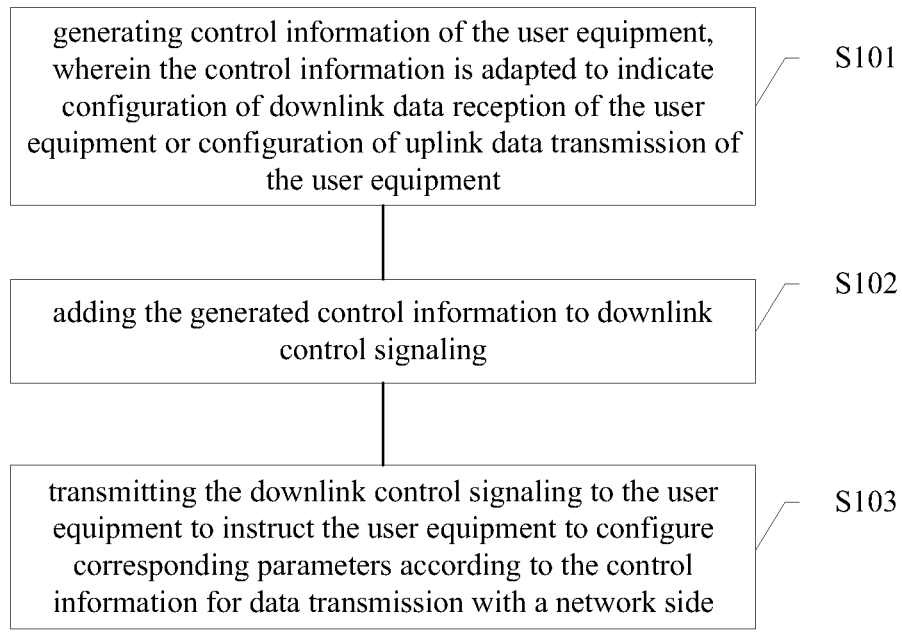
FIG. 1 schematically illustrates a flow chart of a method for controlling a user equipment according to an embodiment of the present disclosure.

FIG. 1 schematically illustrates a flow chart of a method for controlling a user equipment according to an embodiment of the present disclosure. The method for controlling the user equipment shown in FIG. 1 may include: step S101, step S102 and step S103.

In the step S101, control information of the user equipment is generated, wherein the control information is adapted to indicate configuration of downlink data reception of the user equipment or configuration of uplink data transmission of the user equipment.

In an embodiment, the control information generated when a network side performs resource scheduling to the user equipment can be configured as required, so as to improve control flexibility of the user equipment.

For example, the control information includes at least one of subcarrier configuration information and signal waveform configuration information.

Wherein the subcarrier configuration information includes a subcarrier spacing, a cyclic prefix length, number of symbols in a resource unit, number of subcarriers in the resource unit and mode information of a group of reference signals or a plurality of groups of reference signals. Wherein the mode information of the reference signals includes information on sequence and a time-frequency resource location.

In some embodiments of the present disclosure, in order to further save signaling consumption, mutually correlated parameters in configuration information of each group of subcarrier parameters may be set correlatively, that is, only one or more parameters in the multiple correlated subcarrier parameters are set, and other correlated subcarrier parameters can be determined based on configuration information of the set subcarrier parameters. For example, for a group of subcarrier parameters including the subcarrier spacing and the number of subcarriers in the resource unit, the number of subcarriers in the resource unit can be determined when the subcarrier spacing is set.

The signal waveform configuration information may include any of preset multi-carrier waveforms and single carrier waveforms, and the multi-carrier waveforms and the single carrier waveforms are selected from a set of preset signal waveforms. Wherein the set of preset signal waveforms includes a variety of multi-carrier waveforms and single carrier waveforms.

In the step S102, the generated control information is added to downlink control signaling.

In some embodiments, the downlink control signaling is physical layer control signaling, and when determining the control information according to an actual scheduling requirement, the network side device may add the control information to the physical layer control signaling, so as to transmit the control information to the user equipment.

In the step S103, the downlink control signaling is transmitted to the user equipment to instruct the user equipment to configure corresponding parameters according to the control information, so that the user equipment can perform data transmission with the network side.

In some embodiments, the physical layer control signaling is transmitted to the user equipment in the step S103.

The method for controlling the user equipment according to an embodiment of the present disclosure is illustrated in FIG. 1 by taking the physical layer control signaling as an example of the downlink control signaling. It should be understood by those ordinarily skilled in the art that other downlink control signaling may also be used to transmit the control information to the user equipment, which will not be limited thereto.

In some embodiments, the physical layer control signaling is transmitted to the user equipment in a physical layer control channel, and the user equipment can receive the physical layer control signaling by directly decoding the physical layer control channel, that is, the user equipment can acquire the control information without using other physical channels such as a shared channel or being mapped to an MAC layer or an RRC layer. Therefore, configuration delay of the control information can be improved, as well as efficiency of resource configuration of the user equipment.

Figure 2:
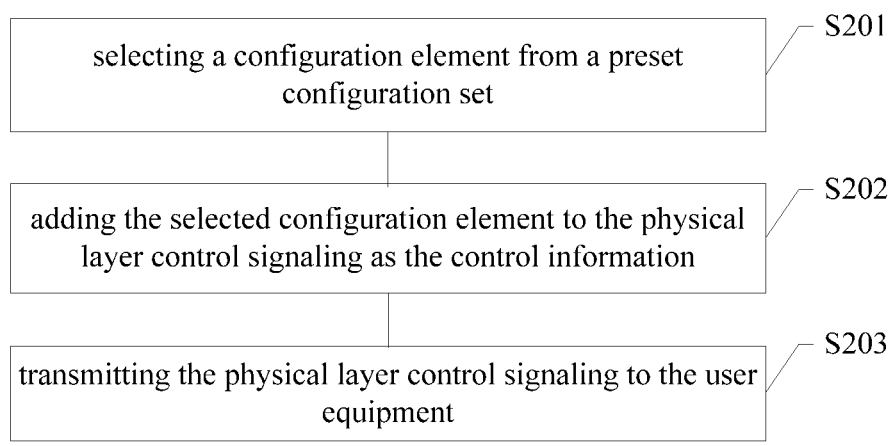
FIG. 2 schematically illustrates a flow chart of a method for controlling a user equipment according to another embodiment of the present disclosure.

FIG. 2 schematically illustrates a flow chart of a method for controlling a user equipment according to another embodiment of the present disclosure. The method for controlling the user equipment shown in FIG. 2 may include: step S201, step S202 and step S203.

In the step S201, a configuration element is selected from a preset configuration set.

Figure 3:
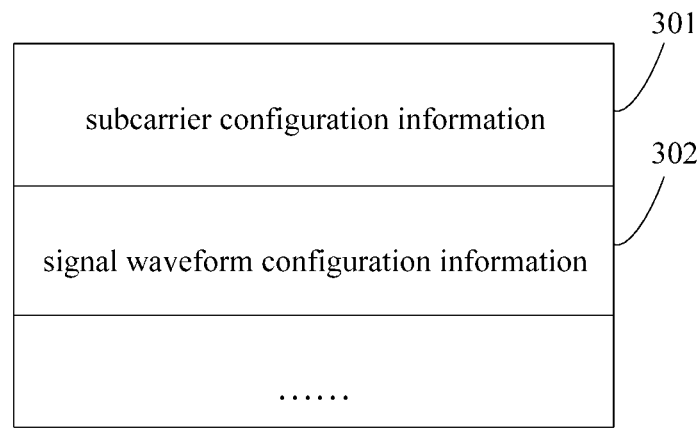
FIG. 3 schematically illustrates a diagram of configuration elements in a configuration set.

Referring to FIG. 3, in some embodiments, the preset configuration set may include a plurality of configuration elements, for example, M configuration elements, wherein M is a positive integer equal to or more than one. Wherein each of the plurality of configuration elements may be at least one of subcarrier configuration information 301 and signal waveform configuration information 302.

The physical layer control signaling may select a corresponding configuration element from the preset configuration set as the control information of the user equipment according to actual requirements such as an operation condition of the network.

In the step S202, the selected configuration element is added to the physical layer control signaling as the control information.

In some embodiments, the physical layer control signaling may add the configuration element selected from the preset configuration set to itself, so as to transmit the configuration element to a corresponding user equipment.

It should be noted that, due to a short transmission period of the physical layer control signaling, compared with generating control information corresponding to the configuration element, selecting the configuration element from the plurality of configuration elements in the preset configuration set by the physical layer control signaling of the network side device can further save consumption of the physical layer control signaling and resource consumption of the network side device.

In the step S203, the physical layer control signaling is transmitted to the user equipment.

In some embodiments, when generating corresponding physical layer control signaling, the network side device may transmit the generated physical layer control signaling to the user equipment via a physical control channel, so that the user equipment can communicate with the network side device, such as a base station, according to the control information decoded from the physical control channel. Therefore, resource scheduling configuration of the user equipment can be realized.

Figure 4:
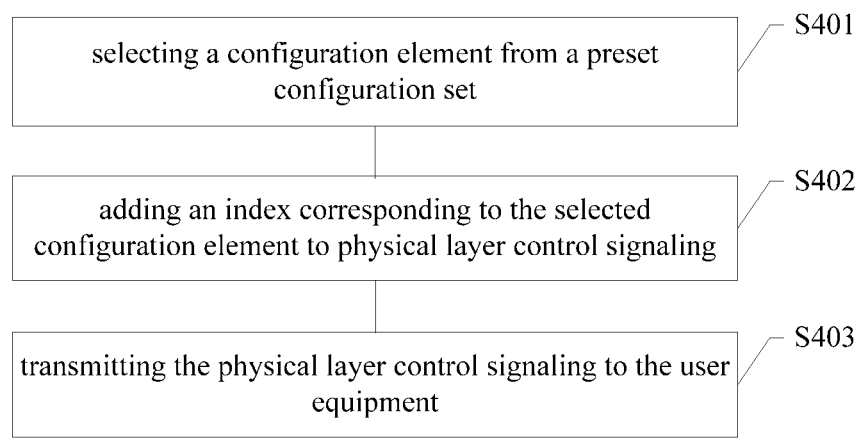
FIG. 4 schematically illustrates a flow chart of a method for controlling a user equipment according to another embodiment of the present disclosure.

In some embodiments, in order to further save resources occupied by signaling, the network side device does not directly transmit the control information itself when transmitting the control information to the user equipment through the physical layer control signaling, but transmits an index corresponding to the control information to the user equipment so that the user equipment can obtain the control information according to the index information transmitted by the network side device, as shown in FIG. 4.

FIG. 4 schematically illustrates a flow chart of a method for controlling a user equipment according to another embodiment of the present disclosure. The method for controlling the user equipment shown in FIG. 4 may include: step S401, step S402 and step S403.

In the step S401, a configuration element is selected from a preset configuration set.

In the step S402, an index corresponding to the selected configuration element is added to physical layer control signaling.

In some embodiments, the network side may establish a one-to-one correspondence relationship between configuration elements and indexes in advance. When the network side determines corresponding user configuration information for the user equipment according to actual requirements, the network side can add an index of the selected configuration element to the physical layer control signaling to transmit the index to the user equipment. For example, when number of configuration elements in a preset configuration set is M, number of bits of the physical layer control signaling may be log 2(M), therefore signaling consumption of the network side device and resources can be saved.

In the step S403, the physical layer control signaling is transmitted to the user equipment.

In some embodiments, when the user equipment receives the physical layer control signaling, the user equipment can decode a corresponding index from the physical layer control signaling and search a relationship table between preset configuration elements and indexes, so as to obtain corresponding control information sent by the network side device.

In some embodiments, in order to further save resources occupied by signaling, when generating the control information of the user equipment, the network side equipment may select a corresponding configuration element from a preset configuration set by combining the physical layer control signaling with MAC layer control signaling and/or RRC signaling, as shown in FIG. 5 to FIG. 8.

Figure 5:
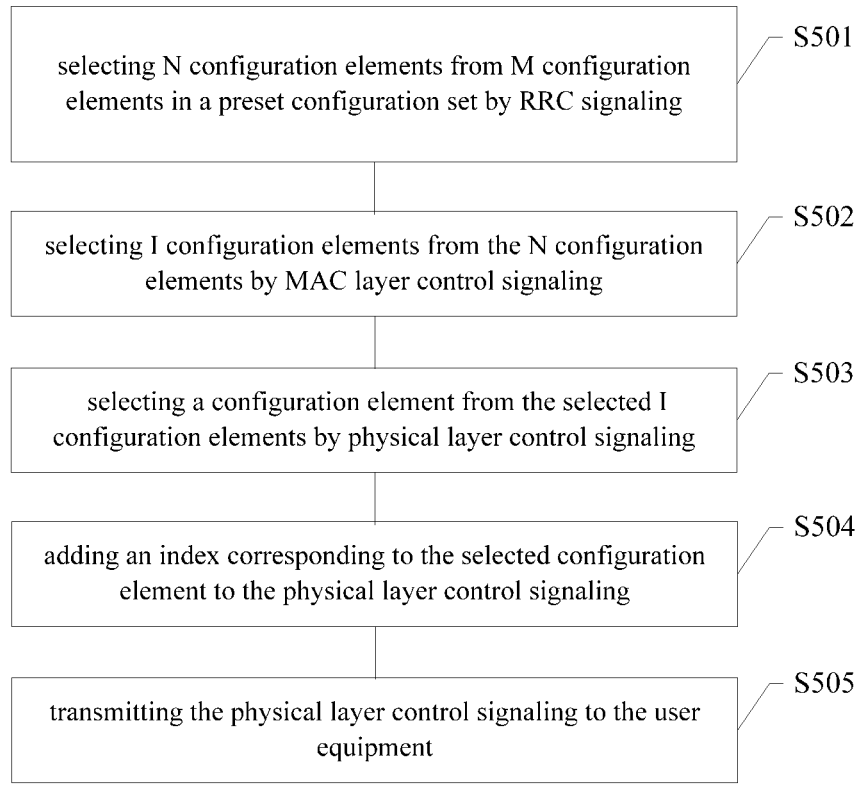
FIG. 5 schematically illustrates a flow chart of a method of controlling a user equipment according to another embodiment of the present disclosure.

FIG. 5 schematically illustrates a flow chart of a method for controlling a user equipment according to another embodiment of the present disclosure. The method for controlling the user equipment shown in FIG. 5 may include: step S501, step S502, step S503, step S504 and step S505.

In the step S501, N configuration elements are selected from M configuration elements in a preset configuration set by RRC signaling.

In some embodiments, N is a positive integer less than or equal to M.

In the step S502, I configuration elements are selected from the N configuration elements by MAC layer control signaling.

In some embodiments, I is a positive integer less than or equal to N.

In the step S503, a configuration element is selected from the selected I configuration elements by physical layer control signaling.

In the step S504, an index corresponding to the selected configuration element in the step S503 is added to the physical layer control signaling.

In the step S505, the physical layer control signaling is transmitted to the user equipment.

Figure 6:
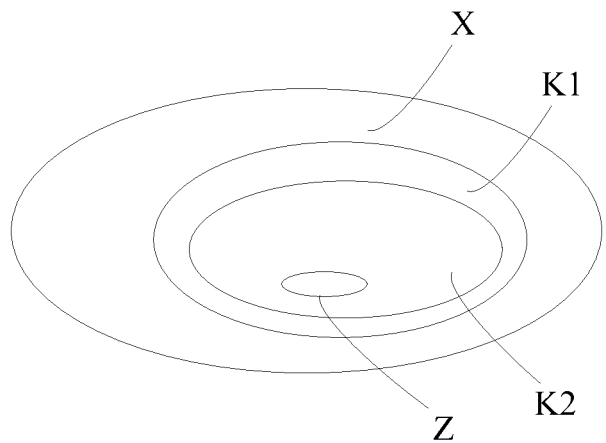
FIG. 6 schematically illustrates a diagram of selecting a configuration element from a preset configuration set according to an embodiment of the present disclosure.

In some embodiments, referring to the FIG. 6, RRC signaling determines a first subset K1 consisting of N configuration elements from M configuration elements in a preset configuration set X, MAC layer control signaling selects I configuration elements from the first subset K1 to form a second subset K2, wherein I is equal to or less than M, and then physical layer control signaling selects a configuration element Z from the I configuration elements in the second subset K2, thus number of bits of the physical layer control signaling may be log 2(I). Accordingly, signaling consumption and resources can be saved.

Figure 7:
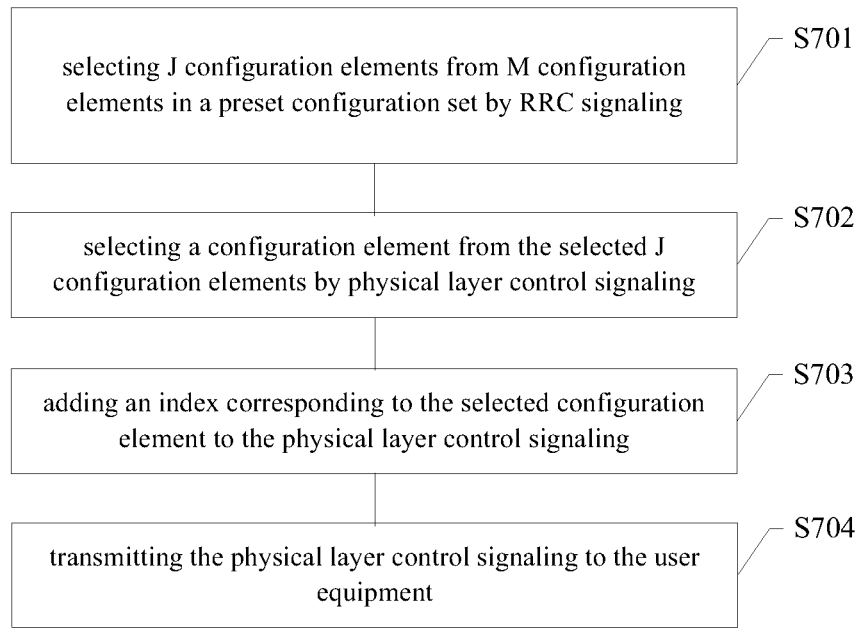
FIG. 7 schematically illustrates a flow chart of a method for controlling a user equipment according to another embodiment of the present disclosure.

FIG. 7 schematically illustrates a flow chart of a method for controlling a user equipment according to another embodiment of the present disclosure. The method for controlling the user equipment shown in FIG. 7 may include: step S701, step S702, step S703 and step S704.

In the step S701, J configuration elements are selected from M configuration elements in a preset configuration set by RRC signaling.

In some embodiments, J is a positive integer which is less than or equal to M.

In the step S702, a configuration element is selected from the selected J configuration elements by physical layer control signaling.

In the step S703, an index corresponding to the selected configuration element in the step S702 is added to the physical layer control signaling.

In the step S704, the physical layer control signaling is transmitted to the user equipment.

Figure 8:
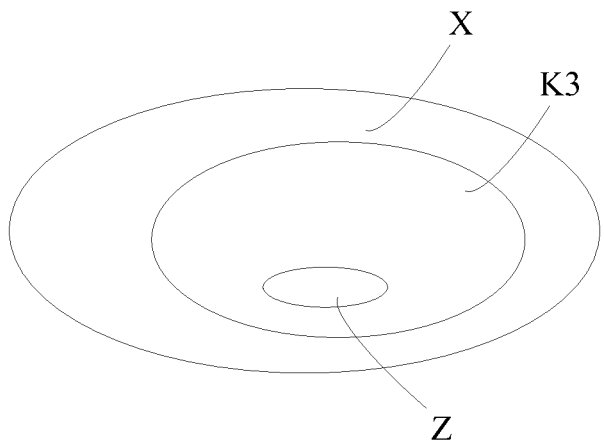
FIG. 8 schematically illustrates a diagram of selecting a configuration element from a preset configuration set according to another embodiment of the present disclosure.

Referring to the FIG. 8, in some embodiments, configuration elements determined by RRC signaling constitute a subset K3 which consists of J configuration elements in M configuration elements in a preset configuration set X, wherein J is less than or equal to M, and the physical layer control signaling selects a configuration element Z from the subset K3, then number of bits of the physical layer control signaling may be log 2(J). Therefore, signaling consumption and resources can be saved.

Figure 9:
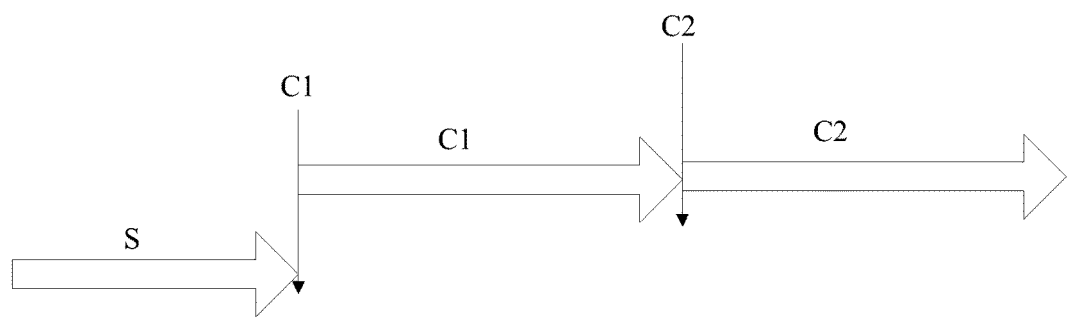
FIG. 9 schematically illustrates a diagram of a period of user configuration information for controlling a user equipment by physical layer control signaling according to an embodiment of the present disclosure.
Figure 9:
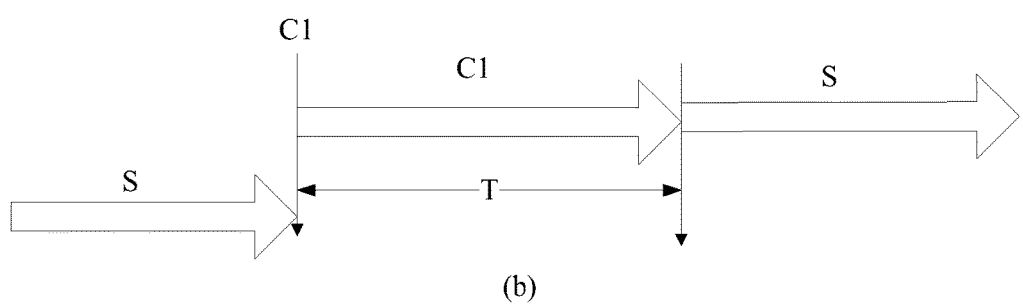

Referring to the FIG. 9, in some embodiments, in order to increase configuration flexibility of a user equipment, when the user equipment receives and decodes physical layer control signaling transmitted by a network side device to acquire control information, the user equipment can perform data transmission with the network side all the time according to the received control information C1 until receiving next control information C2, as shown in FIG. 9(a); or the user equipment may be instructed to perform the data transmission with the network side according to the control information C1 within a preset time period T, and when the preset time period T is due, the user equipment may perform the data transmission with the network side using a preset parameter S, as shown in FIG. 9(b). Wherein, the preset parameter S may be system information which is in a cell level, and may be indicated to the user equipment through the system information; or the preset parameter S may also be RRC connection configuration information which is in a user level, and may be indicated to the user equipment by RRC signaling.

In some embodiments, the physical layer control signaling may be divided into common control signaling and dedicated control signaling in order to increase configuration flexibility. Wherein the common control signaling may be applied to indicate control information of a group of or all user equipments accessing a corresponding cell, and the dedicated control signaling may be applied to indicate control information of one user equipment accessing a corresponding cell.

Therefore, the network side device may add the control information of a group or all user equipments accessing the corresponding cell to the common control signaling for transmission, while add the control information of the specific one user equipment to the dedicated control signaling for transmission according to actual requirements.

In some embodiments, the common control signaling needs to ensure reliability, support reduction in power consumption of the user equipment and support reception of data of the user equipment in various states such as an idle state or a connected state etc., while the dedicated control signaling can support information transmission as much as possible and higher spectral efficiency. Thus, in some embodiments of the present disclosure, the common control signaling and the dedicated control signaling can be separated, for example, the common control signaling and the dedicated control signaling are carried respectively by different resource carriers, to improve flexibility of 5G communication system, as shown in FIG. 10.

Figure 10:
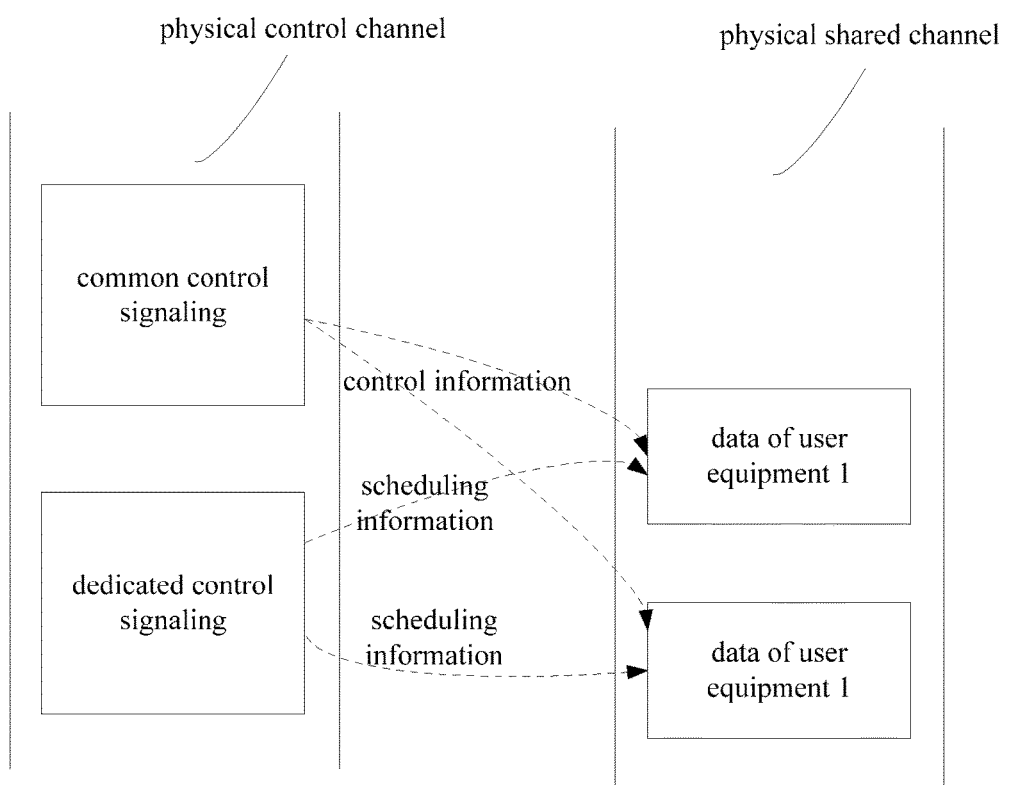
FIG. 10 schematically illustrates a diagram of common control signaling and dedicated control signaling separated in resource according to an embodiment of the present disclosure.

It should be noted that, a physical shared channel shown in FIG. 10 is a channel for data transmission in LTE network. A channel for transmitting data in 5G is referred to as a data transmission channel in the present disclosure.

In some embodiments, the common control signaling and the dedicated control signaling may be periodically transmitted. Wherein a period of the common control signaling may be a preset time period or a time period specified by broadcast information, which is not limited thereto.

Figure 11:
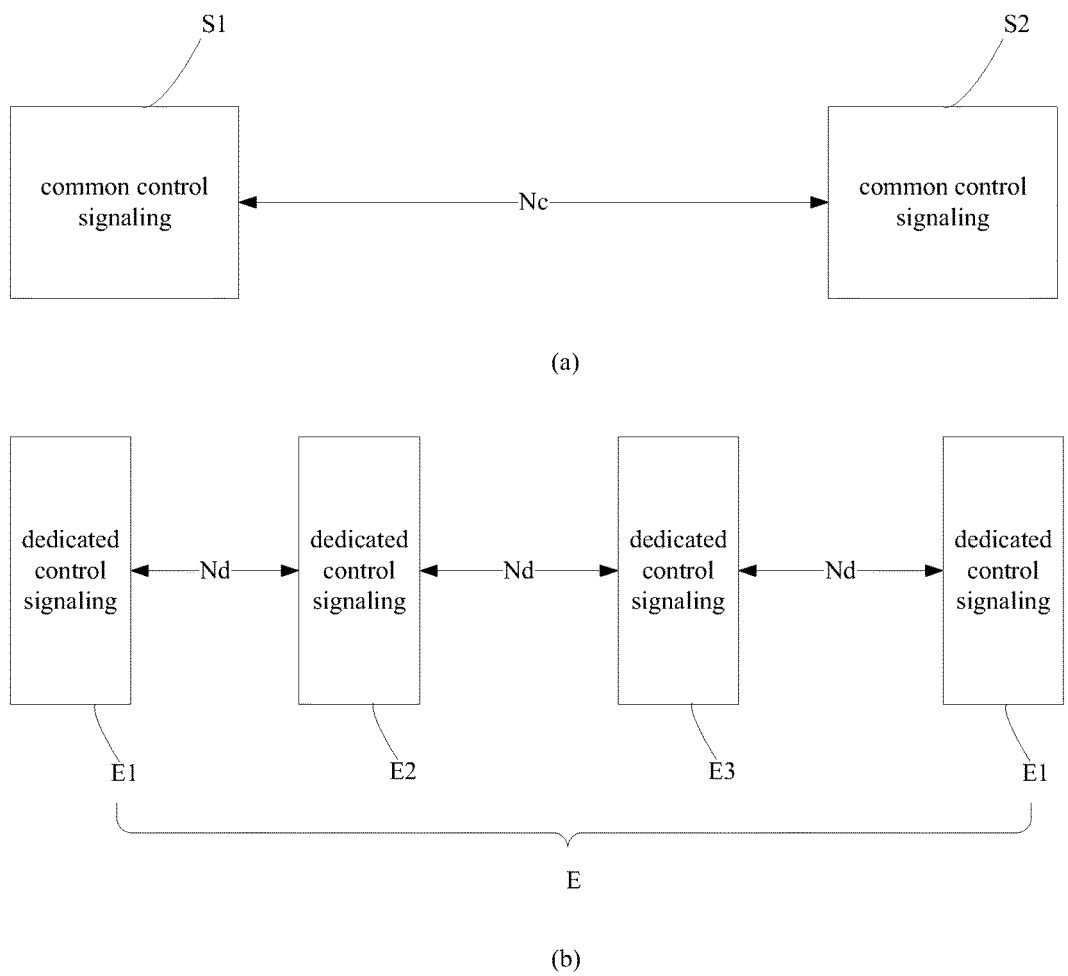
FIG. 11 schematically illustrates a diagram of correlation between the common control signaling and the dedicated control signaling according to an embodiment of the present disclosure.

With reference to FIG. 11, in some embodiments, in order to realize scheduling of the user equipment in various states such as an idle state and a connected state etc., and to support power saving performance of the user equipment, a period Nc (shown in FIG. 11(a)) of the common control signaling is longer than a period Nd (shown in FIG. 11(b)) of the dedicated control signaling. For example, the dedicated control signaling carrying scheduling information (shown in FIG. 10) may take one subframe as a period, while the common control signaling may take n subframes as a period, where n is greater than one.

Wherein, when the period Nc of the common control signaling is longer than the period Nd of the dedicated control signaling, the common control signaling S1 may indicate whether or not some of the user equipments need to detect all of the dedicated control signaling E before next common control signaling S2 arriving. For example, for some user equipments requiring a lower configuration delay, it is possible to indicate the user equipment, by the common control signaling S1, to detect whether or not control information of the user equipment itself is included in all of the dedicated control signaling E before the next common control signaling S2 arriving, i.e., resource scheduling information. For example, the common control signaling S1 may indicate that the user equipment only detects dedicated control signaling E1 to E2 without detecting dedicated control signaling E3, or the common control signaling S1 may indicate that the user equipment only detects the common control signaling S1 without detecting the dedicated control signal E1 to E3, so as to realize power saving of the user equipment.

In some embodiments, format of the common control signaling may be set as required, for example, the format may be set to a fixed format or a dynamically changed format. The format of the common control signaling may be specified by broadcast information when the format of the common control signaling is dynamically changing. Wherein, it should be noted that, the common control signaling includes information that is needed to correctly demodulate and decode a common control part, such as a transmission period, occupied resources and used coding and modulation information etc., in order to demodulate and decode correctly.

In some embodiments, both the common control signaling and the dedicated control signaling may be transmitted by a same carrier wave or by different carriers. And when the common control signaling and the dedicated control signaling are transmitted by different carriers, the different carriers may adopt different Radio Access Technologies (RATs).

Figure 12:
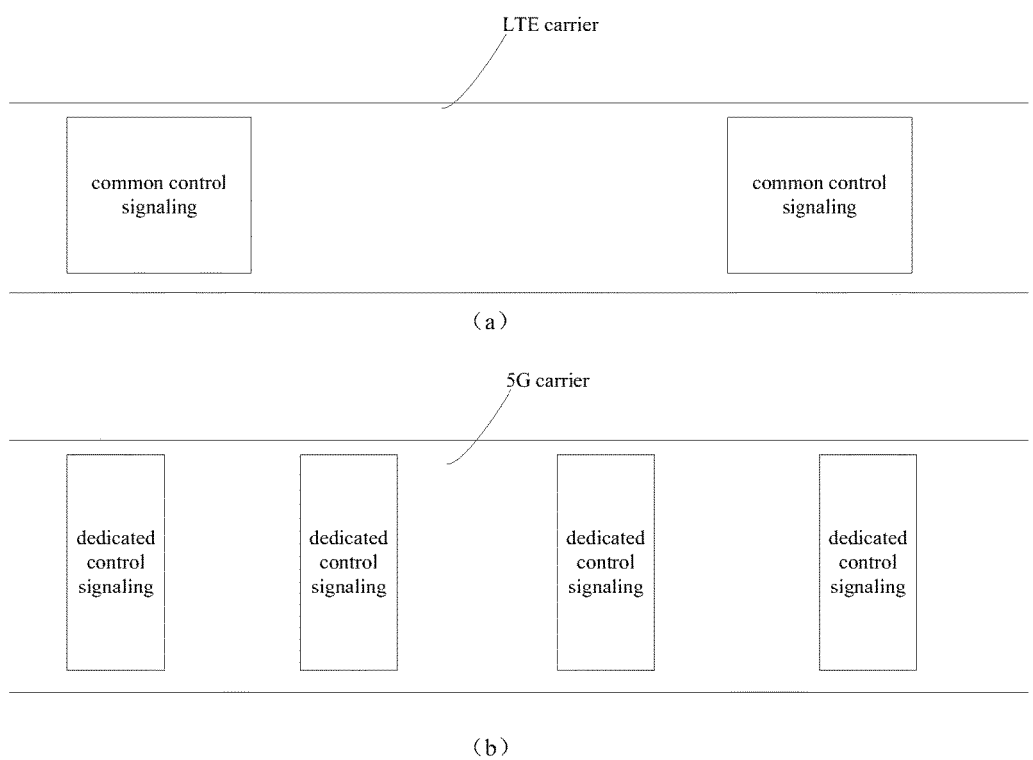
FIG. 12 schematically illustrates a diagram of the common control signaling and the dedicated control signaling carried by different carriers according to an embodiment of the present disclosure.

In some embodiments, both the common control signaling and the dedicated control signaling may be transmitted using a 5G carrier. Please referring to FIG. 12, in order to improve flexibility, the common control signaling may be transmitted by a carrier using other RATs other than 5G, such as an LTE carrier (shown in FIG. 12(a)), while the dedicated control signaling is transmitted by a 5G carrier (shown in FIG. 12(b)).

In some embodiments, a common physical channel of a group of or all user equipments accessing a corresponding cell such as a synchronization channel, a broadcast channel and a control channel etc., may adopt fixed subcarrier configuration and signal waveform configuration, so that the user equipment can receive information of the common physical channel without any indication.

A device corresponding to the aforementioned methods will be described in detail with reference to FIG. 13.

Figure 13:
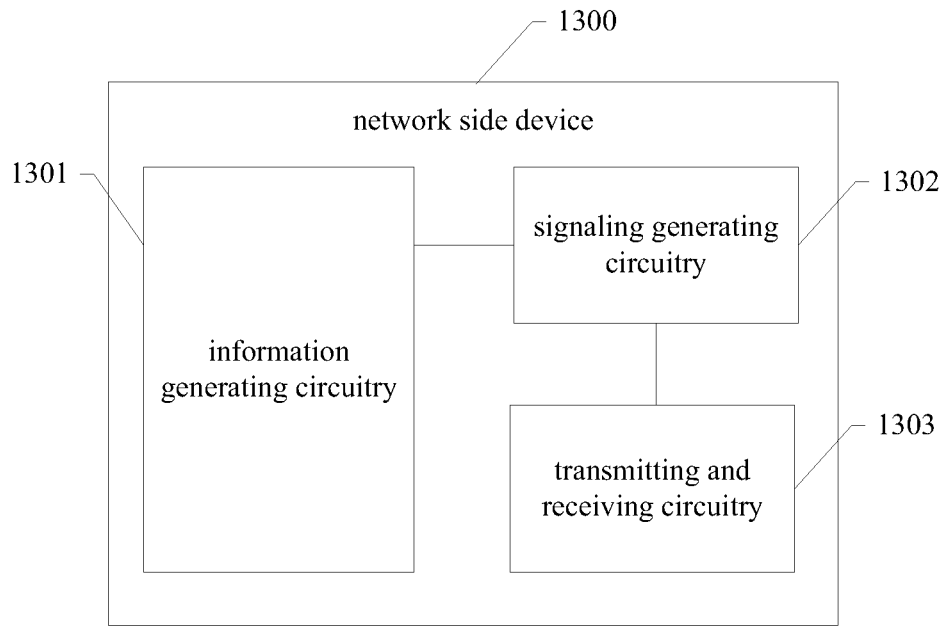
FIG. 13 schematically illustrates a structural diagram of a network side device according to an embodiment of the present disclosure.

FIG. 13 schematically illustrates a structural diagram of a network side device according to an embodiment of the present disclosure. The network side device 1300 shown in FIG. 13 may includes: an information generating circuitry 1301, a signaling generating circuitry 1302 and a transmitting and receiving circuitry 1303.

Wherein, the information generation circuitry 1301 is configured to generate control information of a user equipment.

In some embodiments, the control information includes at least one of subcarrier configuration information and signal waveform configuration information.

In some embodiments, the subcarrier configuration information includes configuration information of a plurality of groups of subcarrier parameters, and configuration information of each group of the plurality of groups of subcarrier parameters includes at least one of a subcarrier spacing, a cyclic prefix length, number of subcarriers in a resource unit, number of symbols in the resource unit and mode information of a group of reference signals or a plurality of groups of reference signals.

In some embodiments, the signal waveform configuration information includes any of multi-carrier waveforms and single carrier waveforms, and the multi-carrier waveforms and the single carrier waveforms are selected from a set of preset signal waveforms.

In some embodiments, downlink control signaling is physical layer control signaling.

In some embodiments, the information generating circuitry 1301 is configured to select a configuration element from a preset configuration set by the physical layer control signaling, and use the selected configuration element as the control information.

In some embodiments, the information generating circuitry 1301 is configured to: select N configuration elements from M configuration elements in a preset configuration set by RRC signaling, where M and N are positive integers and N is equal to or less than M; select I configuration elements from the selected N configuration elements by MAC layer control signaling, wherein I is a positive integer and I is equal to or less than N; and select one configuration element from the selected N configuration elements by the physical layer control signaling as the control information.

In some embodiments, the information generating circuitry 1301 is configured to: select J configuration elements from M configuration elements in a preset configuration set by RRC signaling, where M and J are positive integers and J is equal to or less than M; and select one configuration element from the selected J configuration elements by the physical layer control signaling as the control information.

In some embodiments, the configuration element includes at least one of subcarrier configuration information and signal waveform configuration information.

The signaling generating circuitry 1302 is configured to add the generated control information to the downlink control signaling.

The transmitting and receiving circuitry 1303 is configured to transmit the downlink control signaling to the user equipment to instruct the user equipment to configure corresponding parameters according to the control information, so that the user equipment can perform data transmission with the network side.

In some embodiments, the signaling generating circuitry 1302 is configured to add an index corresponding to the selected configuration element to the physical layer control signaling.

In some embodiments, the physical layer control signaling includes common control signaling and dedicated control signaling; wherein the common control signaling includes control information of a group of or all user equipments accessing a corresponding cell; and the dedicated control signaling includes control information of one user equipment accessing a corresponding cell.

In some embodiments, the signaling generation circuitry 1302 is configured to add the control information to the common control signaling or to the dedicated control signal according to a network condition.

In some embodiments, the common control signaling and the dedicated control signaling are periodically transmitted.

In some embodiments, a transmission period of the common control signaling is longer than a transmission period of the dedicated control signaling.

In some embodiments, the common control signaling further includes information on a receiving object of all of the dedicated control signaling before next common control signaling arriving, to instruct the receiving object to detect the dedicated control signaling; wherein the receiving object is one of the user equipments accessing the corresponding cell.

In some embodiments, the common control signaling is transmitted using an LTE carrier, and the dedicated control signaling is transmitted using a 5G carrier.

In some embodiments, the network side device 1300 is a base station.

The method for controlling the user equipment corresponding to the network side and a network side device have been described in detail above, and a method for controlling the user equipment corresponding to the user equipment side and a user equipment corresponding to the method will be described in detail below.

Figure 14:
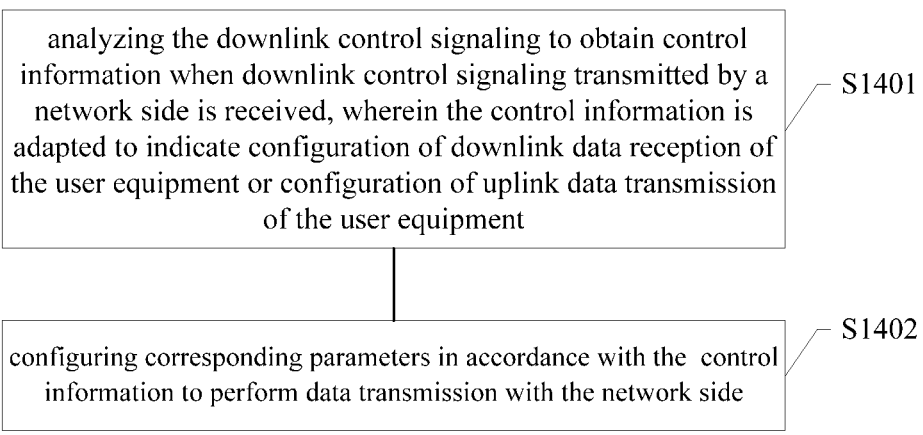
FIG. 14 schematically illustrates a flow chart of a method for controlling a user equipment according to another embodiment of the present disclosure.

FIG. 14 schematically illustrates a flow chart of a method for controlling a user equipment according to another embodiment of the present disclosure. The method for controlling the user equipment shown in FIG. 14 may include the following steps:

step S1401: decoding the downlink control signaling to obtain control information when downlink control signaling transmitted by a network side device is received, wherein the control information is adapted to indicate configuration of downlink data reception of the user equipment or configuration of uplink data transmission of the user equipment; and step S1402: configuring corresponding parameters in accordance with the control information to perform data transmission with the network side device.

Figure 15:
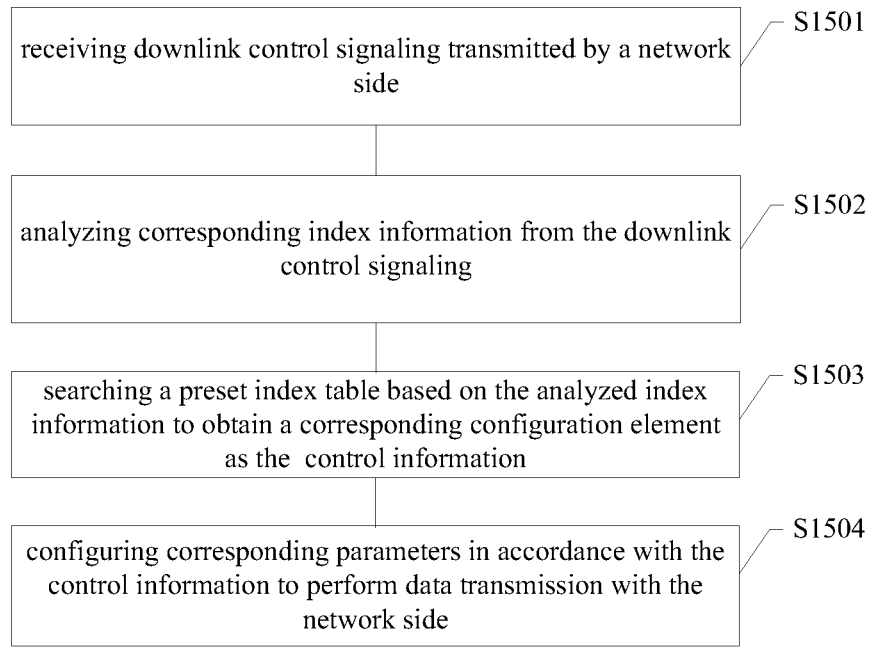
FIG. 15 schematically illustrates a flow chart of a method for controlling a user equipment according to another embodiment of the present disclosure.

FIG. 15 schematically illustrates a flow chart of a method for controlling a user equipment according to another embodiment of the present disclosure. The method for controlling the user equipment shown in FIG. 15 may include the following steps:

step S1501: receiving downlink control signaling transmitted by a network side;

step S1502: decoding corresponding index information from the downlink control signaling;

step S1503: searching a preset index table based on the decoded index information to obtain a corresponding configuration element as the control information; wherein the index table includes a one-to-one correspondence relationship between indexes and configuration elements; and step S1504: configuring corresponding parameters in accordance with the control information to perform data transmission with the network side.

It should be noted that, the steps shown in FIGS. 14 and 15 can refer to corresponding parts in FIGS. 1 to 13, which will not be described herein.

A user equipment corresponding to the aforementioned method will be described in detail below.

Figure 16:
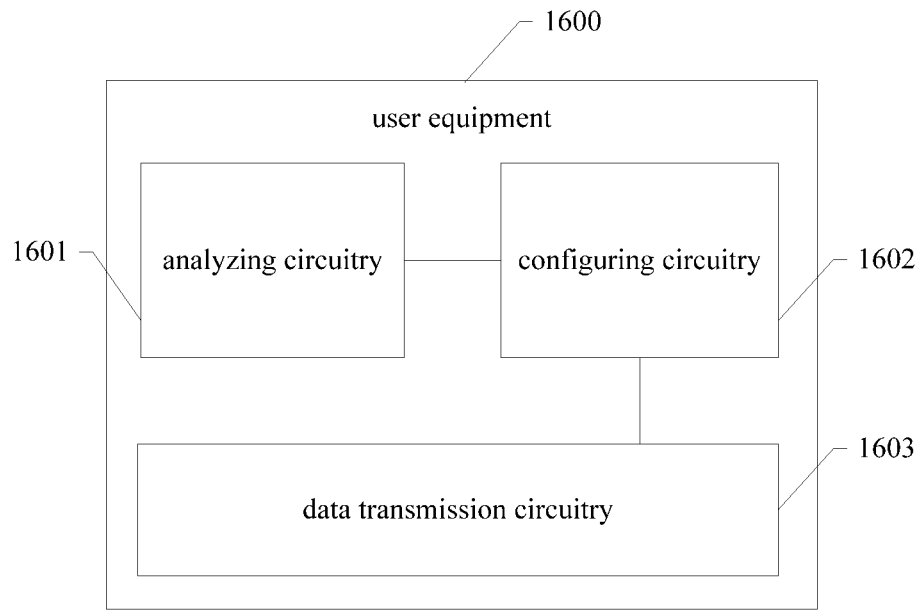
FIG. 16 schematically illustrates a structural diagram of a user equipment according to an embodiment of the present disclosure.

FIG. 16 schematically illustrates a structural diagram of a user equipment according to an embodiment of the present disclosure. The user equipment 1600 shown in FIG. 16 may include: a decoding circuitry 1601 and a configuring circuitry 1602.

Wherein the decoding circuitry 1601 is configured to decode the downlink control signaling to obtain control information, when receiving downlink control signaling transmitted by a network side, wherein the control information is adapted to indicate configuration of downlink data reception of the user equipment or configuration of uplink data transmission of the user equipment.

In some embodiments, the downlink control signaling may be physical layer control signaling, and the physical layer control signaling may include common control signaling and dedicated control signaling; wherein the common control signaling includes control information of a group of or all user equipments accessing a corresponding cell; and the dedicated control signaling includes control information of one user equipment accessing a corresponding cell.

In some embodiments, the common control signaling and the dedicated control signaling are periodically transmitted. In some embodiments, a transmission period of the common control signaling is longer than a transmission period of the dedicated control signaling.

In some embodiments, the common control signaling further includes identification information of all of the dedicated control signaling and identification information of a corresponding receiving object before next common control signaling arriving; and the decoding circuitry 1601 is configured to: decode the identification information of all of the dedicated control signaling and the identification information of the corresponding receiving object before the next common control signaling arriving from the received common control signaling; and receive and decode corresponding dedicated control signaling to obtain the corresponding control information, when it is determined that identification information of the user equipment itself is coincident with the decoded identification information of the receiving object.

In some embodiments, the control information includes at least one of subcarrier configuration information and signal waveform configuration information.

In some embodiments, the subcarrier configuration information includes configuration information of a plurality of groups of subcarrier parameters, and configuration information of each group of the plurality of groups of subcarrier parameters includes at least one of a subcarrier spacing, a cyclic prefix length, number of subcarriers in a resource unit, number of symbols in the resource unit and mode information of a group of reference signals or a plurality of groups of reference signals.

In some embodiments, the signal waveform configuration information includes any of multi-carrier waveforms and single carrier waveforms selected from a set of preset signal waveforms.

In some embodiments, the downlink control signaling is physical layer control signaling.

In some embodiments, the decoding circuitry 1601 is configured to decode corresponding index information from the downlink control signaling; searching a preset index table based on the decoded index information to obtain a corresponding configuration element as the control information; wherein the index table includes a one-to-one correspondence relationship between indexes and configuration elements.

In some embodiments, the control information is applied to configure corresponding parameters of a data transmission channel.

The configuring circuitry 1602 is configured to configure corresponding parameters according to the control information to perform data transmission with the network side.

In some embodiments, the configuring circuitry 1602 is further configured to configure a common physical channel with preset configuration parameters.

In some embodiments, the preset configuration parameters include at least one of subcarrier configuration information and signal waveform configuration information.

In some embodiments, the user equipment 1600 may further include a data transmission circuitry 1603.

The data transmission circuitry 1603 is configured to perform data transmission with the network side using the corresponding parameters within a preset time period, or transmit data with the network side using the corresponding parameters before the next control information is received.

In some embodiments, the data transmission circuitry 1603 is further configured to transmit data with the network side device using preset parameters when the preset time period is due.

Compared with the conventional technology, the present disclosure has the following advantages:

The network side transmits the control information to the user equipment through the downlink control signaling, so that the user equipment can acquire the control information in time to configure the corresponding parameters, and perform the data transmission with the network side using the corresponding configuration parameters instead of using fixed configuration parameters. Thus, configuration flexibility of the user equipment can be improved.

It will be appreciated by those of ordinary skill in the art that all or a portion of the steps in the various methods of the embodiments described above may be performed by means of instructions related to hardware which may be stored in a computer readable storage medium which may include a ROM, RAM, a magnetic disk, or an optical disk.

The method and system of the embodiment of the present disclosure have been described in detail hereinabove, and the present disclosure is not limited thereto. It will be apparent to those skilled in the art that various changes and modifications may be made without departing from the spirit and scope of the invention, and therefore, the scope of the invention should be limited by the scope of the claims.

The invention claimed is:

1. A method for controlling a user equipment, comprising:
generating control information of the user equipment, wherein the control information is adapted to indicate configuration of downlink data reception of the user equipment or configuration of uplink data transmission of the user equipment;
adding the generated control information to downlink control signaling; and
transmitting the downlink control signaling to the user equipment to instruct the user equipment to configure corresponding parameters according to the control information for data transmission with a network side;
wherein the control information comprises at least one of subcarrier configuration information and signal waveform configuration information;
wherein the subcarrier configuration information comprises configuration information of a plurality of groups of subcarrier parameters, and configuration information of each group of the plurality of groups of subcarrier parameters comprises at least one of a subcarrier spacing, number of subcarriers in a resource unit, and number of symbols in the resource unit.

2. The method for controlling the user equipment according to claim 1, wherein the signal waveform configuration information comprises any of multi-carrier waveforms and single carrier waveforms, and the multi-carrier waveforms and the single-carrier waveforms are selected from a set of preset signal waveforms.

3. The method for controlling the user equipment according to claim 1, wherein the downlink control signaling is physical layer control signaling.

4. The method for controlling the user equipment according to claim 3, wherein generating the control information of the user equipment comprises:
selecting a configuration element from a preset configuration set by the physical layer control signaling, and using the selected configuration element as the control information.

5. The method for controlling the user equipment according to claim 3, wherein generating the control information of the user equipment comprises:
selecting J configuration elements from M configuration elements in a preset configuration set by Radio Resource Control (RRC) signaling; wherein M and J are positive integers and J is less than or equal to M; and
selecting a configuration element from the selected J configuration elements by the physical layer control signaling as the control information.

6. The method for controlling the user equipment according to claim 4, wherein adding the generated control information to the downlink control signaling comprises:
adding an index corresponding to the selected configuration element to the physical layer control signaling.

7. The method for controlling the user equipment according to claim 5, wherein adding the generated control information to the downlink control signaling comprises:
adding an index corresponding to the selected configuration element to the physical layer control signaling.

8. The method for controlling the user equipment according to claim 4, wherein the configuration element comprises at least one of subcarrier configuration information and signal waveform configuration information.

9. The method for controlling the user equipment according to claim 5, wherein the configuration element comprises at least one of subcarrier configuration information and signal waveform configuration information.

10. The method for controlling the user equipment according to claim 1, wherein instructing the user equipment to configure the corresponding parameters according to the control information for the data transmission with the network side comprises:
instructing the user equipment to configure the corresponding parameters in accordance with the control information during a preset time period or before receiving next control information, and instructing the user equipment to use preset parameters to perform data transmission with the network side when the preset time period is due.

11. The method for controlling the user equipment according to claim 10, wherein the preset parameters are transmitted to the user equipment by a system information.

12. The method for controlling the user equipment according to claim 10, wherein the preset parameters are transmitted to the user equipment by RRC signaling.

13. The method for controlling the user equipment according to claim 3, wherein the physical layer control signaling comprises common control signaling and dedicated control signaling;
wherein the common control signaling comprises control information of a group of or all user equipments accessing a corresponding cell; and
wherein the dedicated control signaling comprises control information of one user equipment accessing the corresponding cell.

14. The method for controlling the user equipment according to claim 13, wherein adding the generated control information to the downlink control signaling comprises adding the generated control information to the common control signaling or adding the generated control information to the dedicated control signaling according to a network condition.

15. The method for controlling the user equipment according to claim 14, wherein the common control signaling and the dedicated control signaling are transmitted periodically, and a transmission period of the common control signaling is longer than a transmission period of the dedicated control signaling.

16. The method for controlling the user equipment according to claim 15, wherein the common control signaling further comprises information on a receiving object of all of the dedicated control signaling before next common control signaling arriving, to instruct the receiving object to detect the dedicated control signaling; and wherein the reception object is one of the user equipments accessing the corresponding cell.

17. The method for controlling the user equipment according to claim 13, wherein the common control signaling is transmitted using a Long Term Evolution (LTE) carrier, and the dedicated control signaling is transmitted using a 5G carrier.

18. A method for controlling a user equipment, comprising:
decoding downlink control signaling to obtain control information when the downlink control signaling transmitted by a network side is received, wherein the control information is adapted to indicate configuration of downlink data reception of the user equipment or configuration of uplink data transmission of the user equipment; and
configuring corresponding parameters in accordance with the control information, to perform data transmission with the network side;
wherein the control information comprises at least one of subcarrier configuration information and signal waveform configuration information;
wherein the subcarrier configuration information comprises configuration information of a plurality of groups of subcarrier parameters, and configuration information of each group of the plurality of groups of subcarrier parameters comprises at least one of a subcarrier spacing, number of subcarriers in a resource unit, and number of symbols in the resource unit.

19. The method for controlling the user equipment according to claim 18, wherein the signal waveform configuration information comprises any of multi-carrier waveforms and single carrier waveforms, and the multi-carrier waveforms and the single-carrier waveforms are selected from a set of preset signal waveforms.

20. The method for controlling the user equipment according to claim 18, wherein the downlink control signaling is physical layer control signaling.

21. The method for controlling the user equipment according to claim 20, wherein decoding the downlink control signaling to obtain the control information comprises:
   decoding index information from the downlink control signaling; and
   searching a preset index table to obtain a corresponding configuration element as the control information based on the decoded index information, wherein the index table comprises a one-to-one correspondence relationship between indexes and configuration elements.

22. The method for controlling the user equipment according to claim 18, wherein performing the data transmission with the network side comprises:
   performing the data transmission with the network side using the corresponding parameters in a preset time period or before receiving next control information.

23. The method for controlling the user equipment according to claim 22, further comprising: performing the data transmission with the network side using preset parameters when the preset time period is due.

24. The method for controlling the user equipment according to claim 20, wherein the physical layer control signaling comprises common control signaling and dedicated control signaling;
   wherein the common control signaling comprises control information of a group of or all user equipments accessing a corresponding cell; and
   wherein the dedicated control signaling comprises control information of a user equipment accessing a corresponding cell.

25. The method for controlling the user equipment according to claim 24, wherein the common control signaling and the dedicated control signaling are transmitted periodically, and a transmission period of the common control signaling is longer than a transmission period of the dedicated control signaling.

26. The method for controlling the user equipment according to claim 25, wherein the common control signaling further comprises identification information of all of the dedicated control signaling and identification information of a corresponding receiving object before next common control signaling arriving; and
   wherein decoding the downlink control signaling to obtain the control information comprises:
   decoding the identification information of all of the dedicated control signaling and the identification information of the corresponding receiving object from the received common control signaling before the next common control signaling arriving; and
   when it is determined that identification information of the user equipment itself is coincident with the decoded identification information of the receiving object, receiving and decoding corresponding dedicated control signaling to obtain the control information.

27. The method for controlling the user equipment according to claim 18, wherein the control information is applied to configure corresponding parameters of a data transmission channel of the user equipment.

28. The method for controlling the user equipment according to claim 18, further comprising: configuring a common physical channel using preset configuration parameters.

29. The method for controlling the user equipment according to claim 28, wherein the preset configuration parameters comprises at least one of subcarrier configuration information and signal waveform configuration information.

* * * * *